US009463916B2

(12) United States Patent
Cohn (10) Patent No.: US 9,463,916 B2
(45) Date of Patent: Oct. 11, 2016

(54) ZONE HEAT-SEALABLE PACKAGING FILM AND RESULTING POUCH

(71) Applicant: B.S.C. Technologies, Inc., Wilkes-Barre, PA (US)

(72) Inventor: Robert J. Cohn, Dallas, PA (US)

(73) Assignee: B.S.C. TECHNOLOGIES, INC., Wilkes Barre, PA (US)

( * ) Notice: Subject to any disclaimer, the term of this patent is extended or adjusted under 35 U.S.C. 154(b) by 0 days.

(21) Appl. No.: 14/679,856

(22) Filed: Apr. 6, 2015

(65) Prior Publication Data

US 2015/0284168 A1  Oct. 8, 2015

Related U.S. Application Data

(60) Provisional application No. 61/976,818, filed on Apr. 8, 2014.

(51) Int. Cl.
| | |
|---|---|
| *B32B 3/02* | (2006.01) |
| *B65D 81/34* | (2006.01) |
| *B65D 75/58* | (2006.01) |
| *B65D 77/22* | (2006.01) |
| *B65B 29/08* | (2006.01) |
| *B65B 51/30* | (2006.01) |
| *B65B 9/20* | (2012.01) |
| *B29C 65/52* | (2006.01) |
| *B29C 65/00* | (2006.01) |
| *B29L 31/00* | (2006.01) |

(52) U.S. Cl.
CPC ......... *B65D 81/3415* (2013.01); *B29C 65/526* (2013.01); *B29C 66/1122* (2013.01); *B29C 66/43121* (2013.01); *B29C 66/73921* (2013.01); *B65B 9/20* (2013.01); *B65B 29/08* (2013.01); *B65B 51/30* (2013.01); *B65D 75/5855* (2013.01); *B65D 77/225* (2013.01); *B29L 2031/7128* (2013.01); *Y10T 428/24802* (2015.01)

(58) Field of Classification Search
CPC .............. B65D 81/34; B65D 81/3415; B65D 81/3461; B65D 2205/00; B65D 2205/02; B65D 2581/3458; B65D 33/18; Y10T 428/24802; B29C 65/526; B29C 66/1122; B29C 66/43121; B29C 66/73921
See application file for complete search history.

(56) References Cited

U.S. PATENT DOCUMENTS

| | | | |
|---|---|---|---|
| 3,472,723 A | 10/1969 | Lemelson | |
| 5,134,001 A | 7/1992 | Osgood | |
| 5,981,011 A | 11/1999 | Overcash et al. | |
| 2005/0013951 A1 | 1/2005 | Mitchell et al. | |
| 2005/0184065 A1* | 8/2005 | Tucker, Jr. ......... | B65D 81/3461 219/730 |
| 2005/0276885 A1* | 12/2005 | Bennett ................. | A23L 1/0128 426/118 |
| 2006/0257056 A1* | 11/2006 | Miyake .............. | B65D 75/5805 383/103 |
| 2010/0068352 A1* | 3/2010 | Lonergan .............. | A47J 27/088 426/106 |
| 2010/0129503 A1* | 5/2010 | Flaherty ................. | B65D 65/46 426/234 |
| 2011/0163105 A1* | 7/2011 | Su ............................. | B32B 3/02 220/660 |
| 2013/0163105 A1* | 6/2013 | Yumiki ................ | H04N 5/2254 359/823 |

\* cited by examiner

*Primary Examiner* — Elizabeth Mulvaney
(74) *Attorney, Agent, or Firm* — Mitchell A. Smolow (57) ABSTRACT

A high temperature film substrate having a seal material printed thereon in a predefined pattern. The film comprises a pliable high melt temperature substrate and a heat-seal material selectively coated onto the substrate only in an area predetermined to be heat sealed together. Also disclosed is a heat-sealed pouch comprising a pliable high melt temperature substrate and a heat-seal material selectively coated onto the substrate only in a heat sealed area.

28 Claims, 10 Drawing Sheets

ZONE HEAT-SEALABLE PACKAGING FILM AND RESULTING POUCH

CROSS REFERENCE TO RELATED APPLICATIONS

This application claims benefit of U.S. Provisional Application No. 61/976,818 filed Apr. 8, 2014.

FIELD OF THE INVENTION

This invention relates to heat-sealable packaging film for use on standard high speed packaging machinery.

BACKGROUND OF THE INVENTION

Heat-sealable packaging films have a long history of use with high speed packaging equipment such as vertical-form-fill-and-seal, side-seal, and flow-wrap machines. The film is used to wrap and seal a large variety of items including soft and hard goods as well as cooked and uncooked foods. Heat-sealable films fall into two main film categories: polymer materials with a wide melt temperature range which are practical to melt-seal to itself and polymer materials with a narrow melt temperature range which are not practical to melt-seal together. The packaging film referred to herein is in the narrow melt temperature range, used for its overall high melt temperature and good barrier qualities.

Known packaging films are typically made of a pliable high melt temperature substrate which is laminated to a low melt temperature film so the resultant film is heat-sealable to itself. This packaging category is known as Flexible packaging. For the final package to be strong, the film must heat-seal together in a predictable manor without melting onto the hot sealing device.

To accomplish this a high temperature film is used as a substrate to which a suitable low temperature film is laminated forming a unified material. The high and low temperature films must be of a compatible nature so they can be adhered to each other using a suitable laminating adhesive. The high temperature layer forms the package's outside structure while the low temperature layer will act as the package's inside heat-sealing component. During the packaging process the laminated film is wrapped around a contained item then hot sealing irons or jaws are applied to appropriate areas melting the low temperature film components together to form the package's seals.

To produce an effective heat-sealed package the film must be wrapped so the inside laminated low temperature layer is facing itself, inside layer to inside layer. The hot sealing irons are applied to the film's outside high temperature substrate which conducts the heat through to the two adjacent low temperature layers, melting them together to effectively form a seal between the two high temperature film substrates. With low temperature film facing low temperature film the applied heat will melt the low temperature film layer without melting the high temperature substrate. In this way the low temperature layer acts like hot-melt glue to stick the two high temperature layers together.

Since known packaging films are made using the above described laminations, film surfaces can easily be sealed together at any location where the two inner surfaces come into contact with one another in the presence of a high temperature component. Typical heat-seal temperatures are in the 250 degree F. range.

Barrier submersion cooking is a cooking process wherein a cooking pouch contains a food item, the pouch being effectively dimensioned so that when the pouch is placed into a hot liquid cooking medium a vent remains above a top surface of the liquid cooking medium. Typically a rack holding the food containing pouch is lowered into the liquid cooking medium to an effective depth wherein the food item is below the top surface of the liquid cooking medium and the vent is above the top surface of the liquid cooking medium.

The barrier submersion cooking pouch is formed of a pliable material, for example, a polymer film with a melting point above the temperatures conventionally used in hot oil frying processes. The pouch pliability causes the pouch to collapse on itself when exposed to hydrostatic pressures within the cooking medium and the pouch material has a heat transfer rate that allows the food to fry without being directly exposed to the cooking medium. Typically, barrier submersion cooking is conducted at about 350 degrees F. Barrier submersion cooking results in better moisture retention, more efficient flavor infusion, and reduced cooking time.

At the temperature used in the barrier submersion cooking process the water contained in the food will rapidly come to a boil requiring an adequate path for venting of the resulting steam pressure. For this reason a steam vent is formed in the pouch at a location far enough from the food to keep juices from spilling out of the pouch and at a location that does not allow the cooking medium to enter the pouch.

During the barrier submersion cooking process it is easy for the cooking pouch's inside surfaces to come together and potentially seal off the steam vent path. With conventional pouch designs the hydrostatic pressure of the hot cooking medium will press the pouch together causing the facing low temperature layers to stick together and seal off the steam escape path. The resulting steam pressure will rupture the cooking pouch, ruining the contained food.

Conventional steam pouches are designed to vent steam when used in microwave cooking. In microwave cooking the vent needs to be sealed closed for shipping purposes and only open when cooked food produces sufficient steam pressure to cause the vent to open and release sufficient steam pressure so the pouch will not rupture. In this type of steam pouch cooking steam is only reduced to a safe level because a steam bubble is preferred to maintain an umbrella of hot steam over the food until it is fully cooked and the heat source is removed.

With barrier submersion cooking a free flow release of steam pressure must be allowed so the steam does not build a bubble which would cause a steam pressure gap to form between the film and the surface of the food. This steam pressure gap would greatly reduce the temperature seen by the surface of the food. This would result in the food being boiled instead of fried in the areas of the steam bubble.

Accordingly, there is still a continuing need for improved cooking pouch designs. The present invention fulfills this need and further provides related advantages.

BRIEF SUMMARY OF THE INVENTION

The present invention provides for a high temperature film substrate having a seal material printed thereon in a predefined pattern. The heat-sealable packaging film comprises a pliable high melt temperature substrate; and a heat-seal material selectively coated onto the substrate only in an area predetermined to be heat sealed together.

In a second embodiment a heat-sealed pouch comprises a pliable high melt temperature substrate and a heat-seal material selectively coated onto the substrate only in the heat sealed areas.

Other features of the present invention will be apparent from the following more detailed description of the preferred embodiments, taken in conjunction with the accompanying drawings which illustrate, by way of example, the principles of the invention.

BRIEF DESCRIPTION OF THE DRAWINGS

The accompanying drawings are included to provide a further understanding of the present invention. These drawings are incorporated in and constitute a part of this specification, illustrate one or more embodiments of the present invention, and together with the description, serve to explain the principles of the present invention.

Other features and advantages of the present invention will be apparent from the following more detailed description of the preferred embodiments, taken in conjunction with the accompanying drawings which illustrate, by way of example, the principles of the invention.

DETAILED DESCRIPTION OF THE INVENTION

As required, detailed embodiments of the present invention are disclosed; however, it is to be understood that the disclosed embodiments are merely exemplary of the invention that may be embodied in various forms. The figures are not necessary to scale, and some features may be exaggerated to show details of particular components. Therefore, specific structural and functional details disclosed are not to be interpreted as limiting, but merely as a basis for the claims and as a representative basis for teaching one skilled in the art to variously employ the present invention. Where possible, like reference numerals have been used to refer to like parts in the several alternative embodiments of the present invention described herein.

For the purposes of this specification a pliable high melt temperature substrate is a material that does not melt-seal to itself at cooking temperatures. Preferably, it does not melt-seal to itself below about 500 degrees F. and preferably not below about 350 degrees F.

Heat sealing is contemplated to include direct application of heat, for example, with resistance heaters; heat application through ultrasonic waves; and other methods of producing heat. However, one skilled in the art will understand that the invention is not limited to heat activated adhesives and that the heat activated adhesives described below is only an exemplar.

Figure 1:
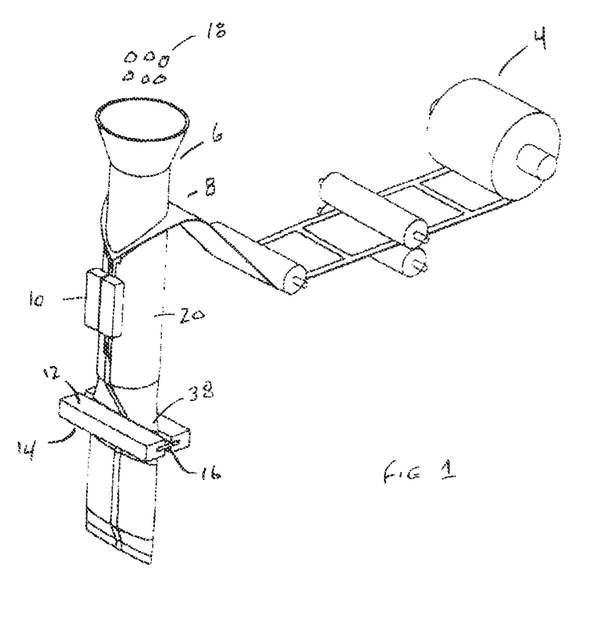
FIG. 1 is a simplified view of a vertical form fill seal packaging machine.
Figure 2:
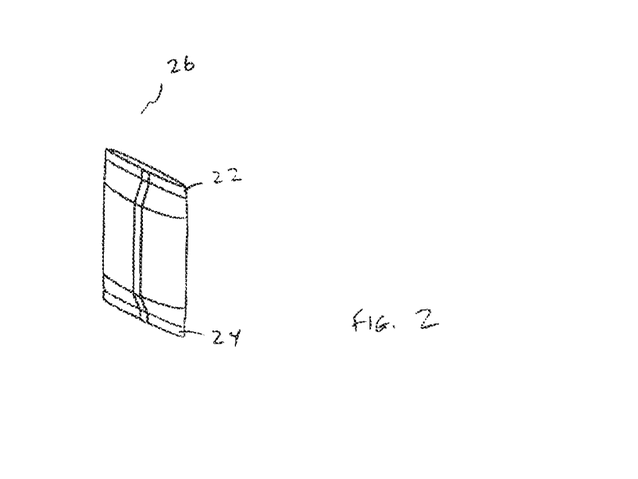
FIG. 2 is a view of the pouch formed by the machine of FIG. 1.

Turning now to FIG. 1, high speed pouch formation is depicted. A supply roll of printed film 4 is fed to a feed tube 6. A collar 8 is formed as the film 4 is wrapped around the feed tube 6. Once fully wrapped, the back seal jaws 10 heat seals the film 4 into a tubular structure 20. Bottom heat seal jaw 12 and top heat seal jaw 14 heat seal the tubular structure as depicted. Food items 18 are fed into the feed tube 6 and timed to enter the tubular structure 20 such that they are contained between a formed top heat seal 22 and a bottom heat seal 24 (FIG. 2). Once the food items 18 are captured knife 16 positioned between the bottom heat seal jaw 12 and top heat seal jaw 14 cuts the filled tubular structure 20 forming individual food filled pouches depicted in FIG. 2.

Conventional packaging film has the heat-seal coating applied to completely cover one entire surface of the film. One of the novel methods presented herein of insuring that the cooking areas 32 of the pouch will not heat seal together during high temperature cooking is to apply a barrier coating 34 capable of isolating the heat seal layer so that the heat seal layer can no longer seal to an adjacent layer during cooking. The barrier coating 34 can be, for example, an applied release coating or a laminated non-sealable film.

Figure 3:
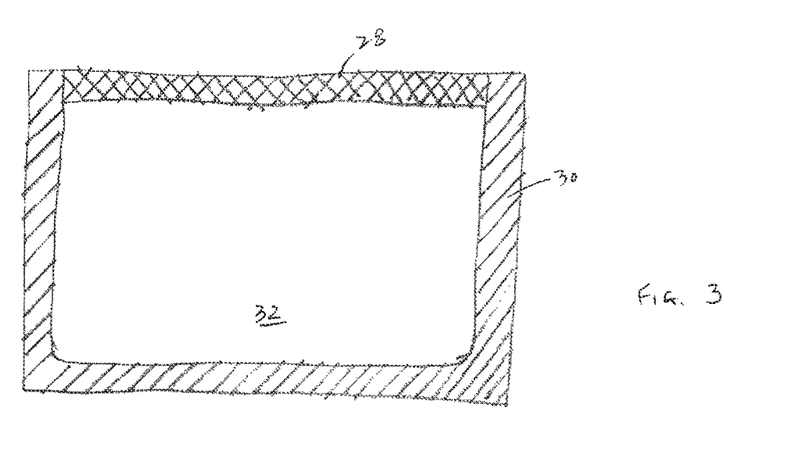
FIG. 3 is a single, basic pattern for forming a heat sealed pouch.
Figure 4:
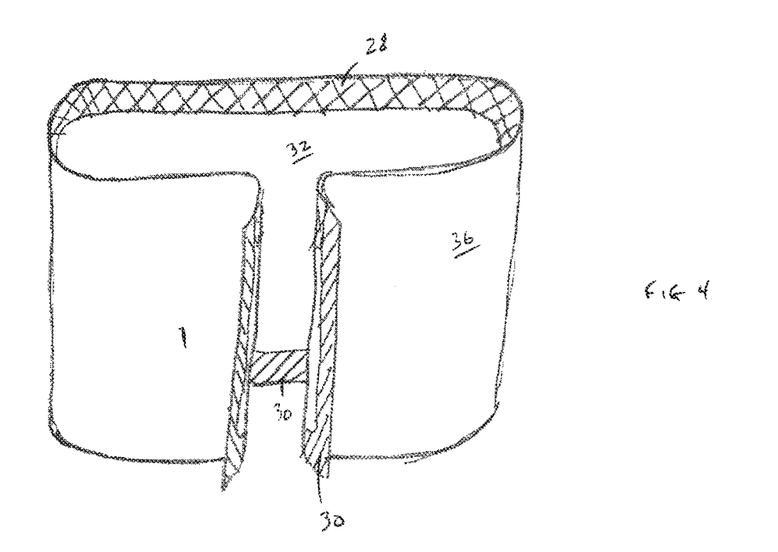
FIG. 4 is the pattern of FIG. 3 partially wrapped to form a pouch body.
Figure 5:
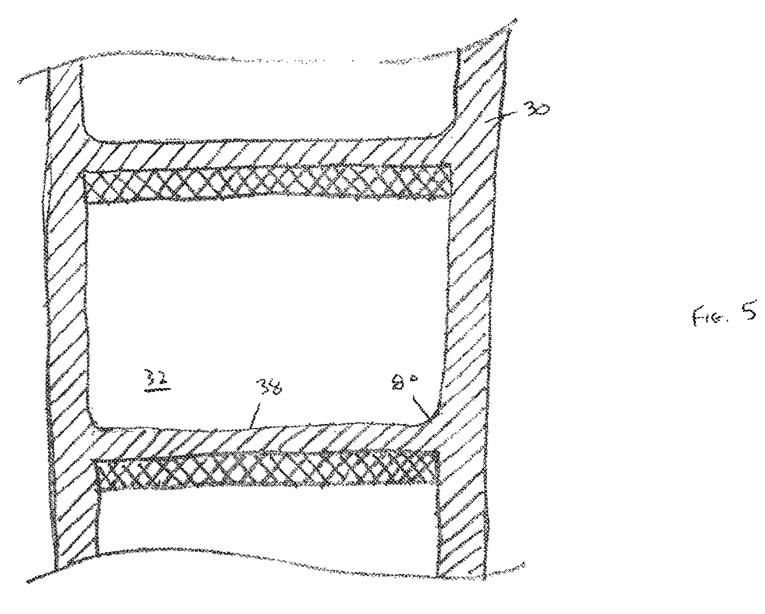
FIG. 5 is a portion of packaging film showing a basic pattern for forming a heat sealed pouch.

Turning now to FIGS. 3-5, in a different novel process one side of a packaging film's high temperature substrate 36 is selectively coated with a seal material 30, for example, a heat-seal material, only in the areas where the package has been predetermined to be sealed together. The top portion of seal material 30 is further designated as a top seal 28. In a preferred embodiment, the heat-seal material is about 13 mm to about 19 mm in width.

The areas having heat-seal material 30 replace the need for the laminated heat seal layer of conventional packaging films. The heat-seal material 30 is selectively applied to the high temperature substrate 36, for example, applied as a die cut lamination or as a liquid which is printed onto the substrate's predetermined sealing areas. The liquid heat-seal material 30 can be applied via methods such as Gravure or flexographic printing. After application of the selectively applied heat-seal material 30 the film will only heat-seal together at the predetermined coated heat-seal areas. When exposed to high cooking temperatures, for example, about 350 degrees F. to about 375 degrees F., the pouch will not seal together in the non-coated areas, for example, in the food cooking area 32. FIG. 5 depicts a film roll 4 selectively coated.

Conventionally, for the heat-seal material 30 to remain intact during cooking temperatures, the material is typically formulated to heat-seal at or above the cooking temperature. Although the substrate's melting point is higher than the heat-seal temperature, the heat-seal temperature is high enough to stress the substrate material. This stress is greatest at the threshold 38 between the heated and unheated areas of the film (FIG. 1). When the pouch is loaded the threshold 38 can be highly stressed as the food items 18 are dropped into the pouch and onto the threshold of the seal. Likewise, the threshold 38 can be highly stressed when the food items move, pull and flex the point of intersection. The threshold

38 is the most likely first point of failure. This weak point can be a problem during packaging, shipping and cooking.

Figure 6:
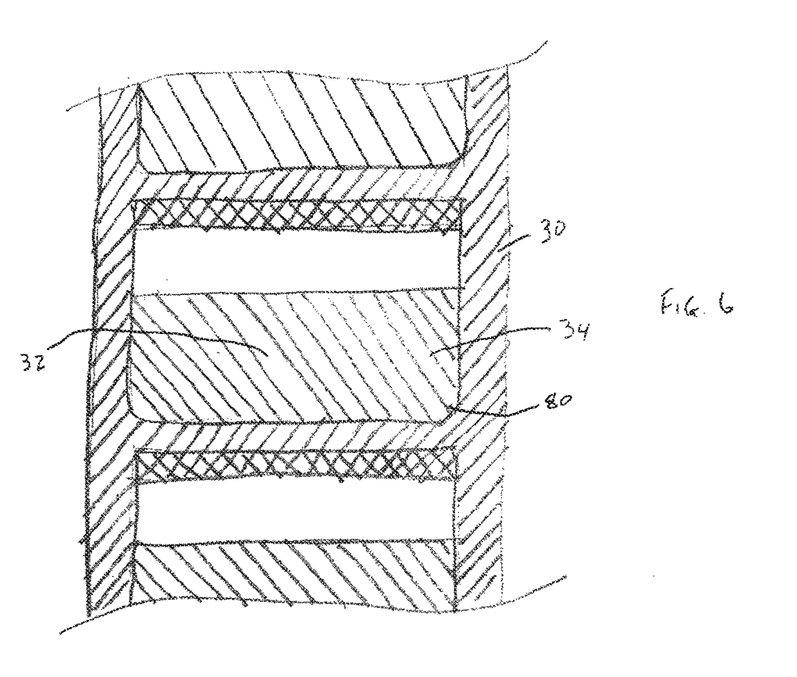
FIG. 6 is a portion of packaging film showing a heat seal material and a barrier coating.

To reduce the stress the intersections of the coated patterns are formed as a radius 80 (FIGS. 5 and 6). The resultant heat-seal will follow the shape of the coating pattern. If the printed seal coat has a radius intersection then the resulting heat-sealed intersection will also have a radius regardless of the heat-seal jaw shape. The heat seal jaws do not need to have a radius as they would were this attempted with a conventional fully-coated heat-seal film, thereby obviating the need for expensive custom shaped jaws.

Because the heat-seal coating is being pattern applied via, for example, printing press, there is the opportunity to add other printed coatings/materials during the print run. Food sticking to the pouch's cooking surface is a problem. As described earlier, a low stick coating, also known as a release coating can be printed onto the food cooking area 32 of the packaging film pattern to reduce or eliminate this problem. Depicted in FIG. 6, the release coating 34 is printed inside the boundaries of the heat-seal coating so as to not inhibit the heat-seal quality.

Figure 7:
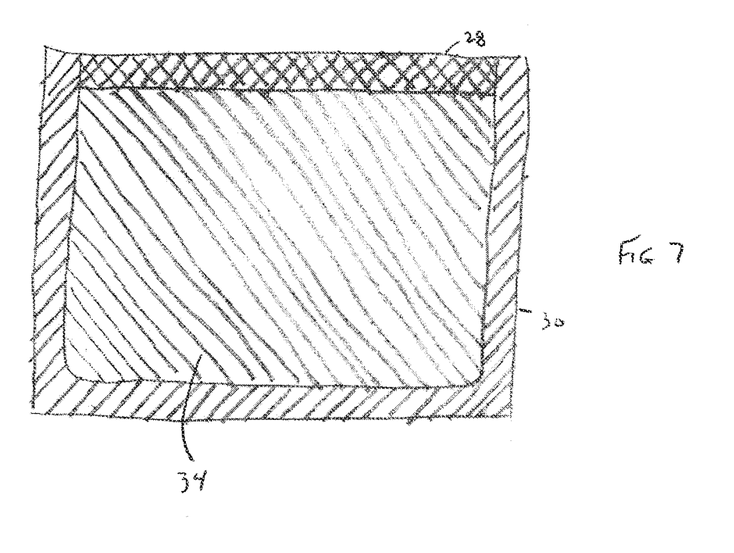
FIG. 7 is a single pouch pattern with heat seal material and full barrier coating.
Figure 8:
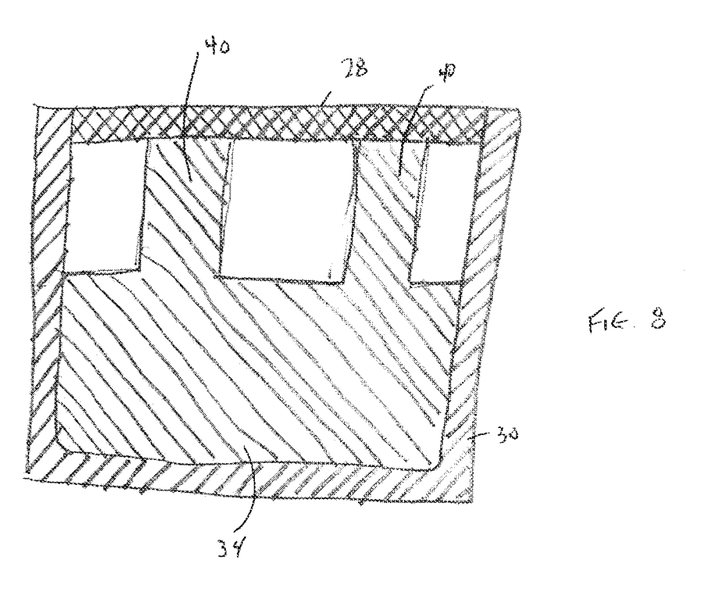
FIG. 8 is a single pouch pattern with heat seal material and partial barrier coating.

During the barrier submersion cooking process food juices can migrate up above the food cooking area. These juices tend to be sticky and will adhere to the surface of the untreated film thus inhibiting proper steam venting. Also applying the release coating 34 to the upper area (the area above the food cooking area) of the cooking pouch will prevent these juices from causing the pouch sides to stick together above the food cooking area 32 (FIG. 7). The release coating 34 can be applied to the entire upper pouch area, for example, within about the upper one third or within about the upper two thirds of the pouch, or as depicted in FIG. 8 the release coating 34 may be selectively applied in, for example, vertical strips 40 which act as chimneys to vent steam pressure away from the food cooking area 32.

When it is desirable to add printed information or graphics to the inside cooking area of the pouch, the use of food grade inks are required. Food grade inks tend to have lower substrate adhesion qualities which result in unwanted transfer of ink to the food item being cooked. Release coatings 34 act as a barrier against ink transfer and can easily be employed by printing the release coat over the food grade ink.

Printed heat seal coatings present additional benefits over conventional methods in that they add production flexibility to the packaging film. Some applications require the pouch top to be fully sealed as with conventional packaging. This is important to guard against food contamination when longer storage periods are required. Other applications do not require a fully sealed top as the package will be shipped in a sealed master pack and have a shorter storage time.

When used for barrier submersion cooking it is necessary that the top of the pouch 26 be sufficiently open to insure a free flow of steam venting during cooking. If the pouch 26 is fully sealed the pouch top seal 28 must be torn or cut before cooking. This requires a separate action by the operator. Alternatively, the pouch top is partially sealed leaving a single or a series of open areas sufficiently large to insure free flow steam venting during cooking but not large enough for food items to exit the pouch. As described earlier, printed heat-seal material 30 is employed to produce a pattern having open or uncoated areas across the top seal area of the pouch.

Figure 9:
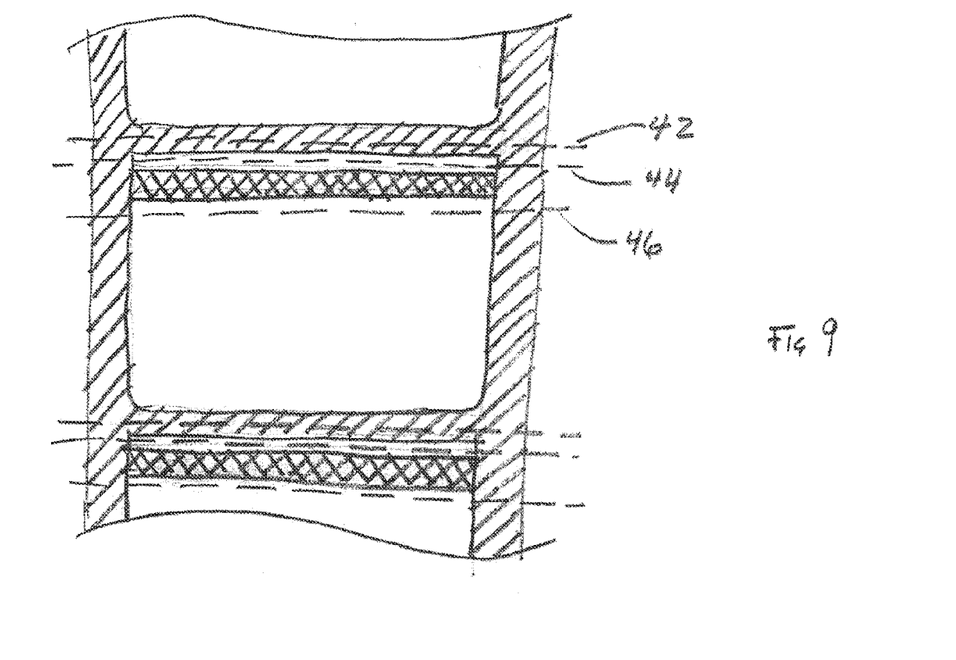
FIG. 9 is a printed seal material pattern which permits multiple cut point options.

FIG. 9 depicts a printed seal material pattern which permits multiple cut point options including full seal 42, partial seal 44, and no seal 46. To select the appropriate seal during pouch manufacture, the packaging machine is indexed to cut the pouches apart at the predetermined cut point location. The multiple cut points allows the top seal type to be selected at the point of packaging thereby reducing the number of packaging film versions to be inventoried.

Figure 10:
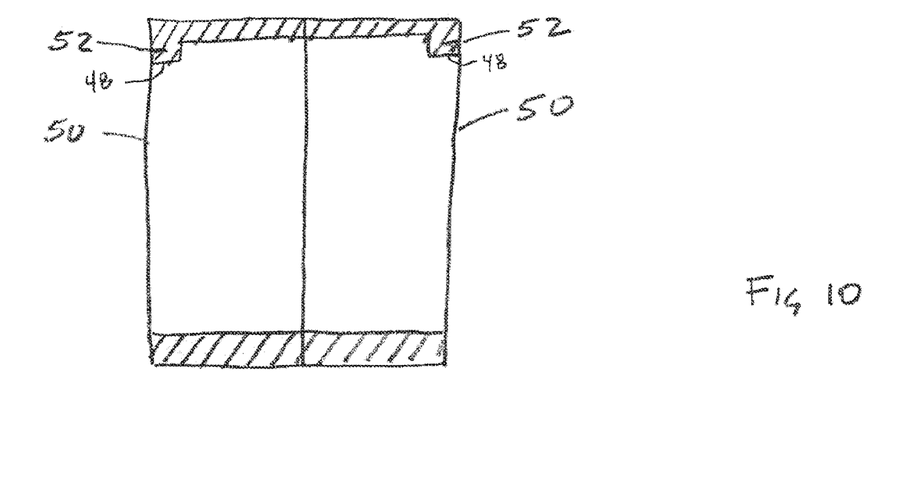
FIG. 10 is a pattern having an extended seal area located at the pouch side folds.

FIG. 10 depicts a pattern having an extended seal area 48 which is wider than the width of the seal located at the side folds 50 of the pouch. The extended seal area is heat-sealed using, for example, an oversized straight heat-seal jaw which covers the extended seal area. Since the pouch will only seal where the heat-seal coating has been applied, the result is an extended sealed side area that can accommodate a tear slit 52 without opening an air path into the body of the sealed pouch. This is important because no additional heat sealing jaws need be added to the packaging machine to allow for the side tear slit to be created.

High temperature heat-seals can be used on cooking pouches when seal integrity is important during cooking. However, when packaging film is heat-sealed at high temperatures the film is stressed in the heated areas. This will cause a stress line at the edge of the heat-seal areas. This stress line is most critical at the top of the bottom heat-seal because the food item is dropped into the pouch during the pouch forming and filling process. The food item will drop onto the lower seal area resulting in high impact to the top edge of the bottom seal. The top of the bottom seal is the high stress line which can be brittle as it is the boundary between the high temperatures heat-seal and the ambient temperature pouch body. This high stress boundary line is a weak point and may break when impacted by the load being dropped into the pouch.

Figure 11:
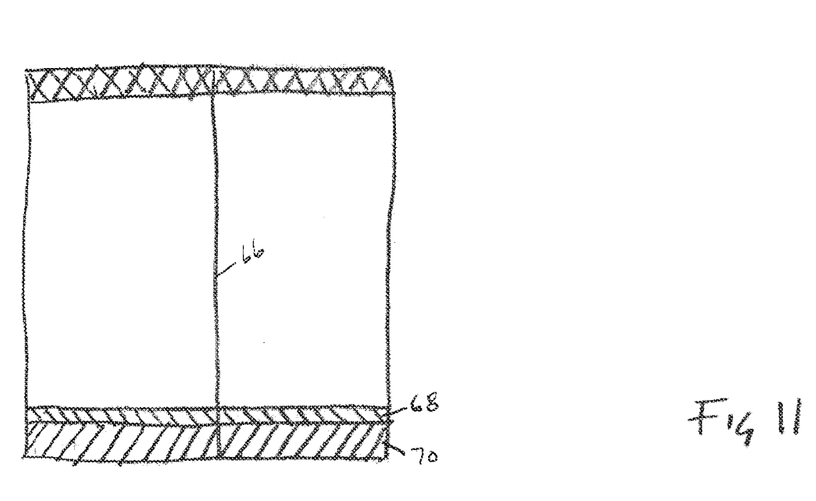
FIG. 11 uses two heat-seal temperature zones to form the bottom seal.

Having heat seal jaws larger than the heat seal area causes the point of high stress to be moved away from the edge of the seal. In this way the highly stressed intersecting point is beyond the joining point of the seal and unsealed material. Depicted in FIG. 11, a novel method uses two heat-seal temperature zones to form the bottom seal. The upper zone 68 is sealed at a lower temperature than the lower zone 70 to cause less heat stress on the substrate. The lower heat zone 70 is sealed at a higher temperature than the upper zone 68 to ensure a liquid tight seal during high temperature cooking. In a preferred embodiment the upper heat zone 68 is about 5 mm and the lower heat zone 70 is about 13 mm. Preferably, the upper heat zone 68 has a width of about 25% to about 50% of the total width of two zones.

Figure 12:
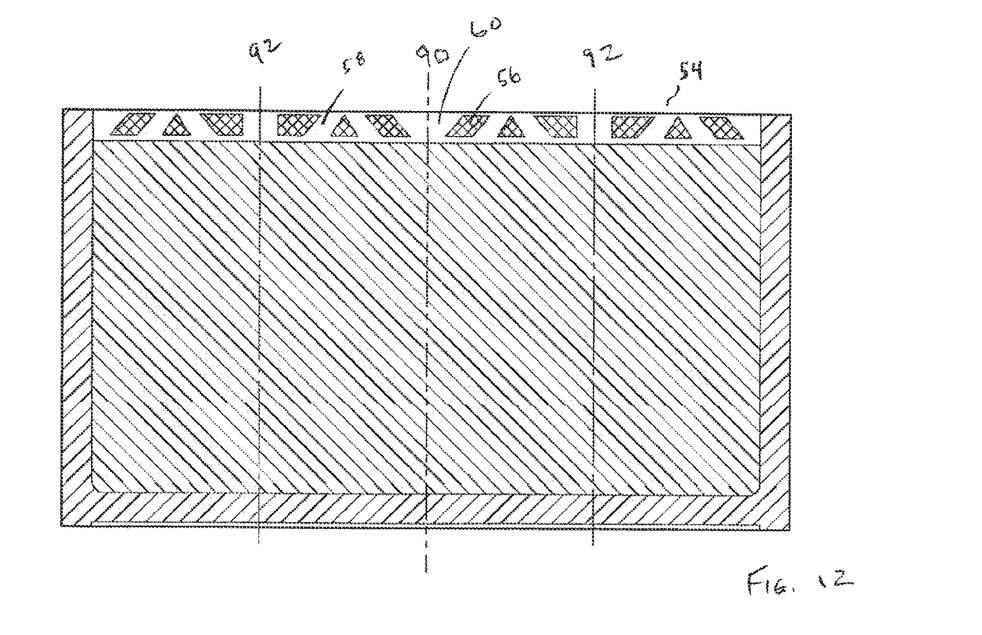
FIGS. 12 and 13 are views of an alternate top seal pattern.
Figure 13:
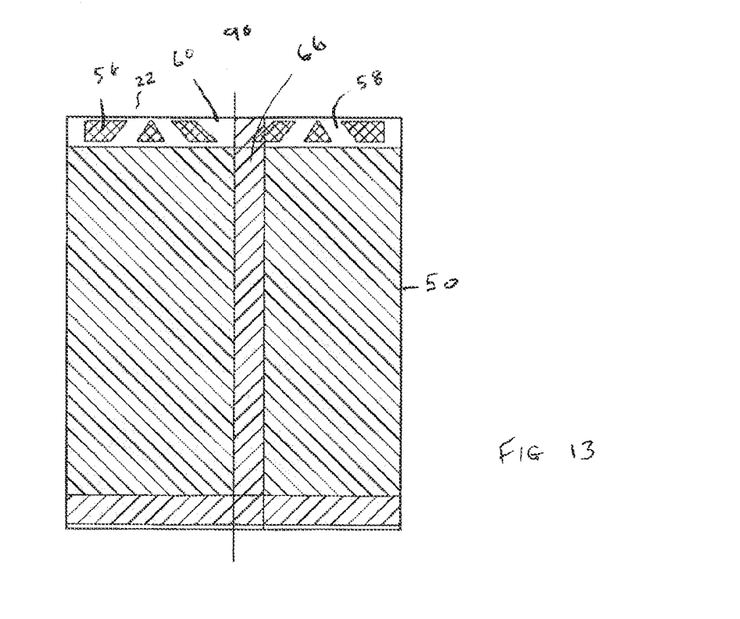

Turning to FIGS. 12 and 13, in another embodiment interrupted top seal gate 54 allows a free flow ventilation of steam pressure while restricting food from exiting the pouch during shipping and storage. Interrupted top seal gate 54 is accomplished by, for example, the use of multiple heat seal shapes 56 separated by open spaces 58. The heat seal shapes 56 are of a geometric design that does not provide a straight path of withdrawal, thereby preventing the food item from falling out of the pouch. This pattern allows for free vent flow to occur anywhere along the top heat seal 22. Noted on FIG. 12 are the centerline 90 and two fold lines 92.

While the heat seal pattern is held to close tolerance by the characteristics of graphic printing, that high tolerance is not achievable during the automatic packaging process. The film pattern may not match up exactly when the film is wrapped around the loading cylinder of the packaging equipment. This may result in a horizontal misalignment of the gate pattern. For that reason the gated vent pattern allows for free flow in multiple locations all along the pouch seal.

The addition of slanted open areas further inhibit the exit of small food items from the pouch during shipping, while maintaining the open venting areas in that they prevent a straight unimpeded path of withdrawal for the food item.

The preferred top heat seal patterns shown in FIGS. 12 and 13 include a wide center gap 60 to allow the operator to more easily grip and open the center area of the pouch. Preferably the wide center gap 60 is V shaped.

Figure 14:
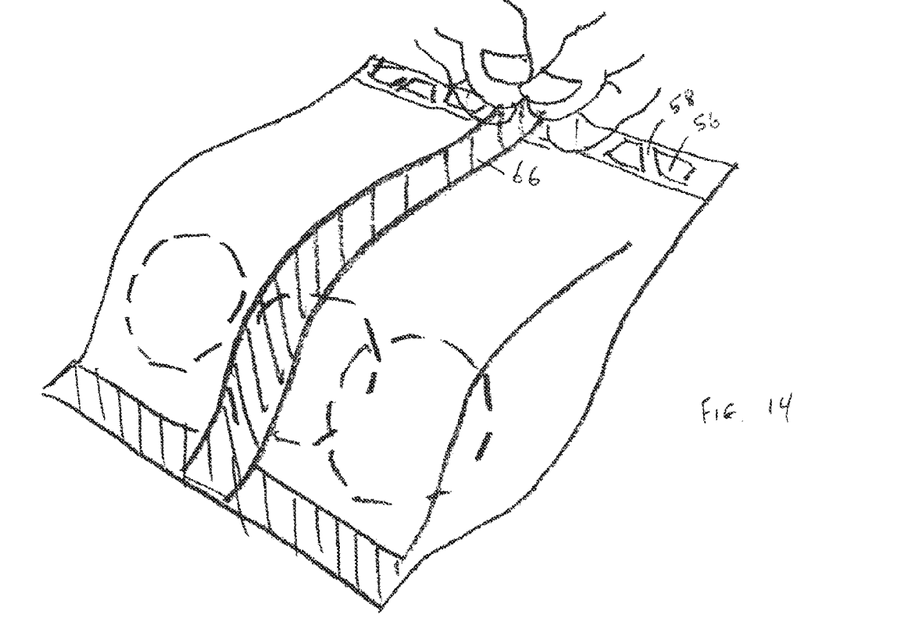
FIGS. 14 and 15 depict an operator opening a pouch.
Figure 15:
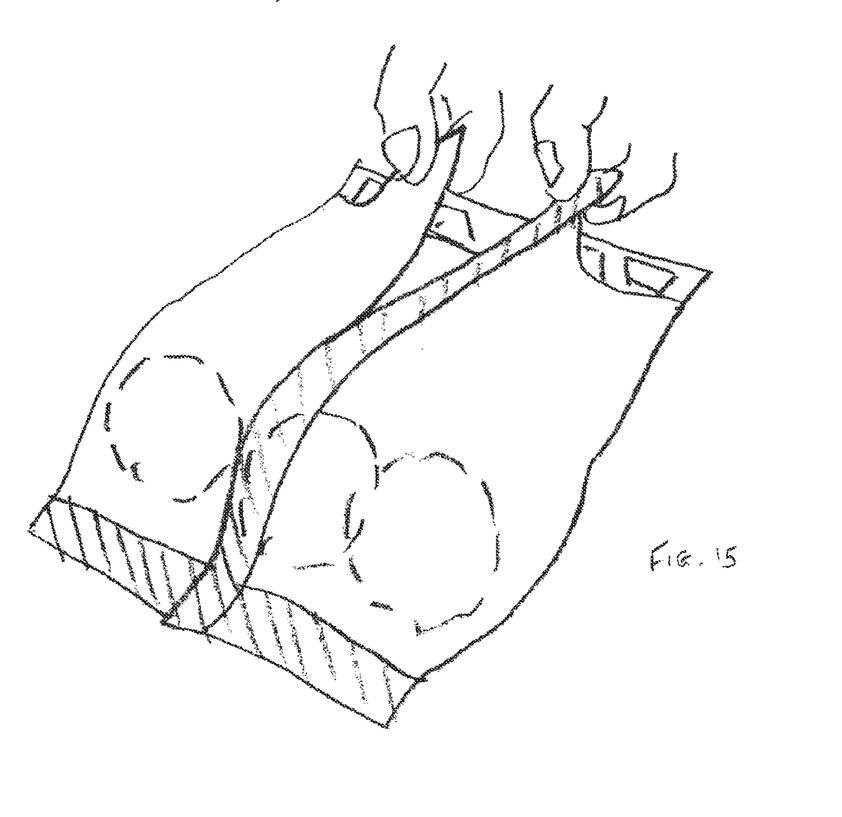

Depicted in FIGS. 14 and 15, the operator must separate the front and back film walls and grip the area around the back longitudinal seal (fin seal) 66 with fingers of each hand. The operator then pulls the film apart at the fin seal as it is the weakest longitudinal area of the pouch. This weakness is due to heat seal stresses resulting from high heat sealing of the fin seal during initial package formation.

Figure 16:
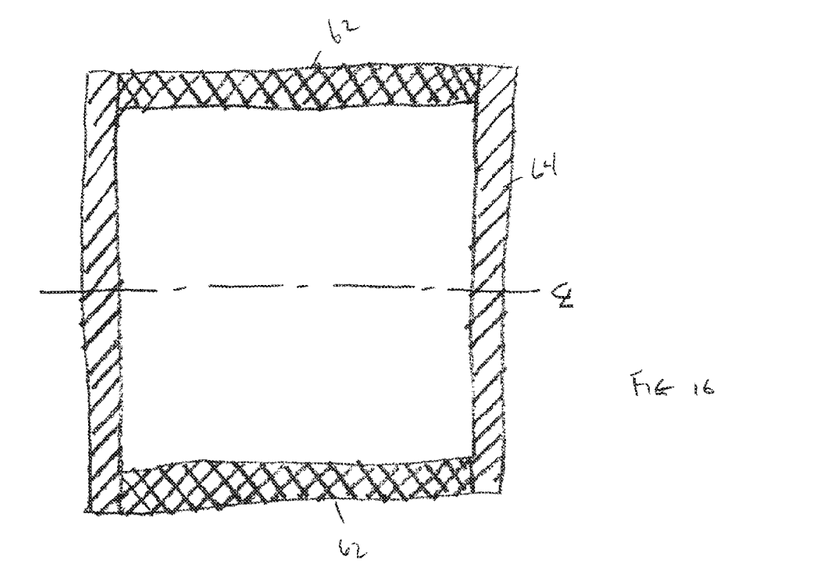
FIGS. 16-21 depict a side seal pouch.
Figure 17:
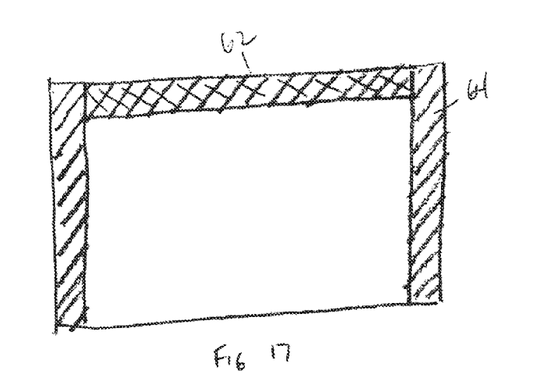
Figure 18:
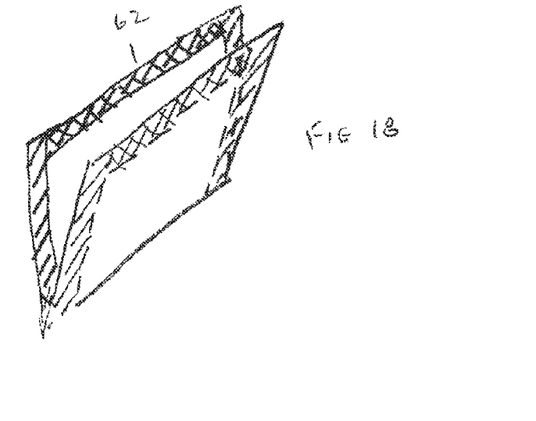

Turning to FIGS. 16-21, side seal pouches have the heat-seal material at the sides of the pouch. FIG. 16 shows the pattern for a 3 side seal pouch. FIG. 17 is a side view of the formed pouch. FIG. 18 shows the film folded to form a pouch with 3 side seals.

Figure 19:
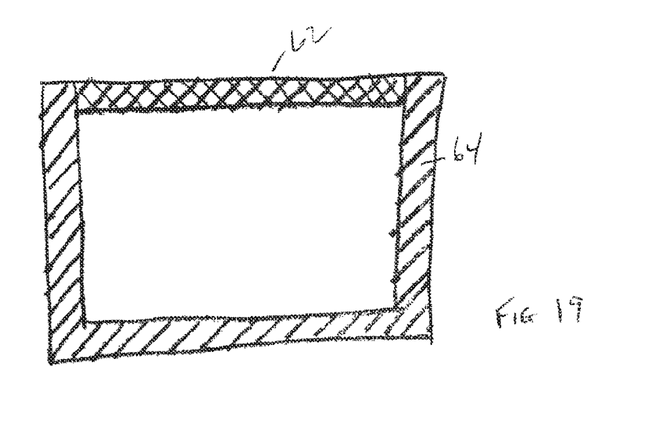
Figure 20:
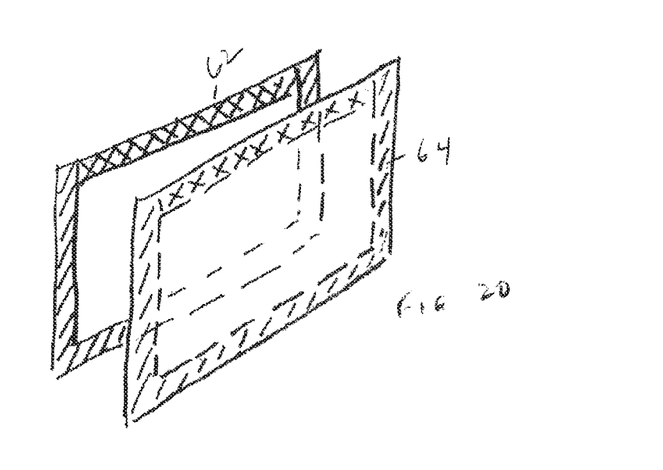
Figure 21:
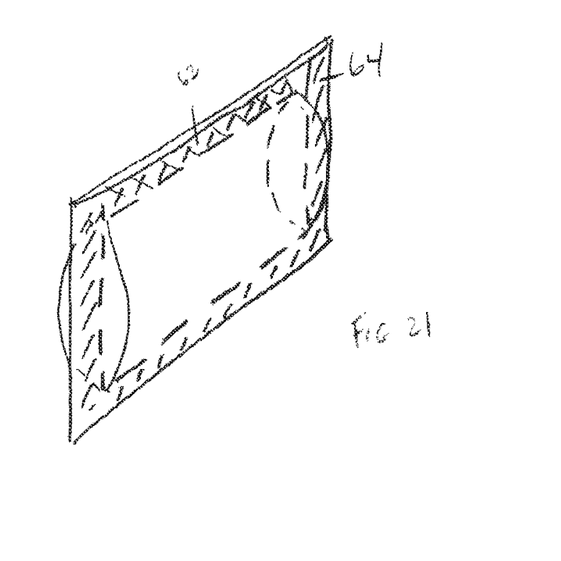

FIG. 19 shows the pattern for a 4 side seal pouch. FIG. 20 shows how two film patterns are brought together face-to-face to form a 4 side seal pouch as shown in FIG. 19.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A sealable packaging film comprising:
a pliable high melt temperature substrate;
a seal material selectively coated onto the substrate only in an area predetermined to be later sealed together; and
a barrier coating applied to a cooking area of the substrate.

2. The packaging film of claim 1 wherein the seal material is printed onto the substrate.

3. The packaging film of claim 2 wherein the seal material is about 13 mm to about 19 mm in width.

4. The packaging film of claim 1 wherein the seal material comprises a radius coating at an intersection of coated patterns.

5. The packaging film of claim 1 wherein the barrier coating is a release coating; and further comprising the release coating applied to a substrate area above the cooking area.

6. The packaging film of claim 5 wherein the release coating is applied in a venting pattern above the cooking area.

7. The packaging film of claim 1 further comprising a top seal material pattern having a full seal area, a partial seal area, and a no seal area.

8. The packaging film of claim 1 comprising a top seal material pattern having an extended area.

9. The packaging film of claim 1 further comprising a top seal material pattern of interrupted top seal gates.

10. The packaging film of claim 9 wherein the top seal gates comprise seal shapes separated by a plurality of open spaces.

11. The packaging film of claim 10 wherein the open space is a slanted open space.

12. The packaging film of claim 10 wherein the top seal gates further comprise a center gap wider than the open space.

13. The packaging film of claim 12 wherein the center gap is V shaped and the seal material is a heat seal material.

14. A sealed pouch comprising:
a pliable high melt temperature substrate;
a seal material selectively coated onto the substrate only in a sealed area and
a barrier coating applied to a cooking area of the substrate.

15. The pouch of claim 14 wherein the seal material comprises a radius at an intersection of seal material.

16. The pouch of claim 14 wherein the barrier coating is a release coating; and further comprising the release coating applied to a substrate area above the cooking area.

17. The pouch of claim 16 wherein the release coating is applied in a venting pattern above the cooking area.

18. The pouch of claim 14 comprising a top seal having an extended seal area.

19. The pouch of claim 14 further comprising a top seal having interrupted top seal gates.

20. The pouch of claim 19 wherein the top seal gates comprise seal shapes separated by a plurality of open spaces.

21. The pouch of claim 20 wherein the open space is a slanted open space.

22. The pouch of claim 19 wherein the top seal gates further comprise a center gap wider than the open space.

23. The pouch of claim 22 wherein the center gap is V shaped and the seal material is a heat seal material.

24. The pouch of claim 14 further comprising a bottom heat seal comprising an upper zone sealed at a lower temperature than a lower zone.

25. The pouch of claim 24 wherein the upper zone is a width of about 25% to about 50% of a bottom seal width.

26. A pouch comprising:
A pliable high melt temperature substrate laminated to a low melt temperature film;
heat sealed borders formed by the low melt temperature film heat sealed to itself;
a cooking area within the heat sealed borders; and
a barrier coating applied within the heat sealed borders to the low melt temperature film.

27. The pouch of claim 26 wherein the barrier coating is a release coating; and further comprising a release coating applied to a substrate area above the cooking area.

28. The pouch of claim 27 wherein the release coating is applied in a venting pattern above the cooking area.

* * * * *